(12) United States Patent
Lin

(10) Patent No.: US 12,174,663 B2
(45) Date of Patent: Dec. 24, 2024

(54) DOCKING DISPLAY WITH A BUILT-IN HUB

(71) Applicant: Realtek Semiconductor Corp., HsinChu (TW)

(72) Inventor: Yuh-Wey Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 238 days.

(21) Appl. No.: 18/090,502

(22) Filed: Dec. 29, 2022

(65) Prior Publication Data

US 2023/0341898 A1 Oct. 26, 2023

(30) Foreign Application Priority Data

Apr. 20, 2022 (TW) .................................. 111114966

(51) Int. Cl.
*G06F 1/16* (2006.01)
*G06F 3/147* (2006.01)
*G06F 13/40* (2006.01)

(52) U.S. Cl.
CPC ............ *G06F 1/1632* (2013.01); *G06F 3/147* (2013.01); *G06F 13/409* (2013.01)

(58) Field of Classification Search
CPC ...... G06F 1/1632; G06F 3/147; G06F 13/409; G06F 1/1601; G06F 1/1605; G09G 5/006
See application file for complete search history.

(56) References Cited

U.S. PATENT DOCUMENTS

| 6,558,049 | B1 * | 5/2003 | Shin .......................... G06F 3/14 710/63 |
| 9,164,930 | B2 * | 10/2015 | Zeng ....................... G06F 13/14 |
| 2004/0268408 | A1 * | 12/2004 | Lee .................... H04N 21/6143 725/89 |
| 2012/0127367 | A1 * | 5/2012 | Glen ...................... G09G 5/393 348/571 |
| 2016/0085713 | A1 * | 3/2016 | Glik ...................... H04W 76/14 710/304 |
| 2019/0042503 | A1 * | 2/2019 | Montero ............. G06F 13/4282 |
| 2020/0302894 | A1 * | 9/2020 | Khen ....................... G09G 5/14 |

FOREIGN PATENT DOCUMENTS

| CN | 110955627 A | 4/2020 |
| CN | 113608583 A | 11/2021 |

* cited by examiner

*Primary Examiner* — Farley Abad
(74) *Attorney, Agent, or Firm* — Winston Hsu

(57) ABSTRACT

A docking display has a multi-stream transmission (MST) port, an MST controller, a display panel, a control circuit, a hub, a first video output port, and a second video output port. The MST port is used for inputting at least one video stream. The MST controller is used for processing the at least one video stream. The control circuit is used for outputting a first video stream of the at least one video stream to the display panel to drive the display panel to display images according to the first video stream. When the at least one video stream has a plurality of video streams, the hub outputs a second video stream of the video streams from a first output port of the hub to the first video output port, or from a second output port of the hub through the MST controller to the second video output port.

13 Claims, 3 Drawing Sheets

FIG. 2

| Symbols of components | 20 | 30 | 40 | 50 | 60 | 70 | 80 | 90 | 100 |
|---|---|---|---|---|---|---|---|---|---|
| Video streams — V1 | V1 | | | | | | | | |
| V1, V2 | | V1, V2 | V1 | V1 | | | | | |
| V1, V2 | | V1, V2 | V1, V2 | V1 | V2 | | | | |
| V1, V2 | | V1, V2 | V1, V2 | V1 | V2 | V2 | V2 | V2 | V2 |
| V1 to V3 | | | V1 to V3 | V1 | V2, V3 | | | | |
| V1 to V3 | | | V1 to V3 | V1 | V2, V3 | V2, V3 | | V2, V3 | V2, V3 |
| V1 to V3 | | | V1 to V3 | V1 | V2, V3 | | V2, V3 | | |
| V1 to V3 | | | V1 to V3 | V1 | V2, V3 | V2 | V3 | V3 | V3 |
| V1 to V3 | | | V1 to V3 | V1 | V2, V3 | V2 | V2 | V3 | V3 |
| V1 to V4 | | | V1 to V4 | V1 | V2 to V4 | V2 to V4 | V2 | | |
| V1 to V4 | | | V1 to V4 | V1 | V2 to V4 | V2 | V3 | V4 | V4 |

DOCKING DISPLAY WITH A BUILT-IN HUB

BACKGROUND OF THE INVENTION

1. Field of the Invention

The present invention relates to a display, and more particularly to a display with a docking function.

2. Description of the Prior Art

When using a display, a user often utilizes a docking station to expand the interfaces for various signals, so as to simultaneously connect multiple displays and many other devices. However, since the display and the docking station are two different devices that need their own spaces, using these two devices at the same time wastes a lot of space. In addition, when the docking station is only connected to one display, the internal hub for video distribution cannot be turned off because the hub is set on the video transmission path, resulting in unnecessary power consumption.

SUMMARY OF THE INVENTION

An embodiment of the present invention provides a docking display, which comprises a first video output port, a second video output port, a multi stream transport (MST) port, a display panel, a control circuit and a hub. The MST port is configured to input at least one video stream. The MST controller comprises a first input port coupled to the MST port for receiving the at least one video stream, a first output port for outputting the at least one video stream, a second input port, and a second output port coupled to the first video output port. The display panel is configured to display images. The control circuit comprises a first input port coupled to the first output port of the MST controller for receiving the at least one video stream, a first output port for outputting a first video stream of the at least one video stream to the display panel, so that the display panel displays the images according to the first video stream, and a second output port for outputting video streams of the at least one video stream other than the first video stream when the at least one video stream comprises a plurality of video streams. The hub comprises an input port coupled to the second output port of the control circuit, a first output port coupled to the second input port of the MST controller, and a second output port coupled to the second video output port. When the at least one video stream comprises the plurality of video streams, the hub outputs a second video stream of the plurality of video streams from the first output port of the hub or the second output port of the hub.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates several possible situations of video streams received by each device of the docking display in FIG. 1 when different numbers of video streams are received by the docking display.

DETAILED DESCRIPTION

Figure 1:
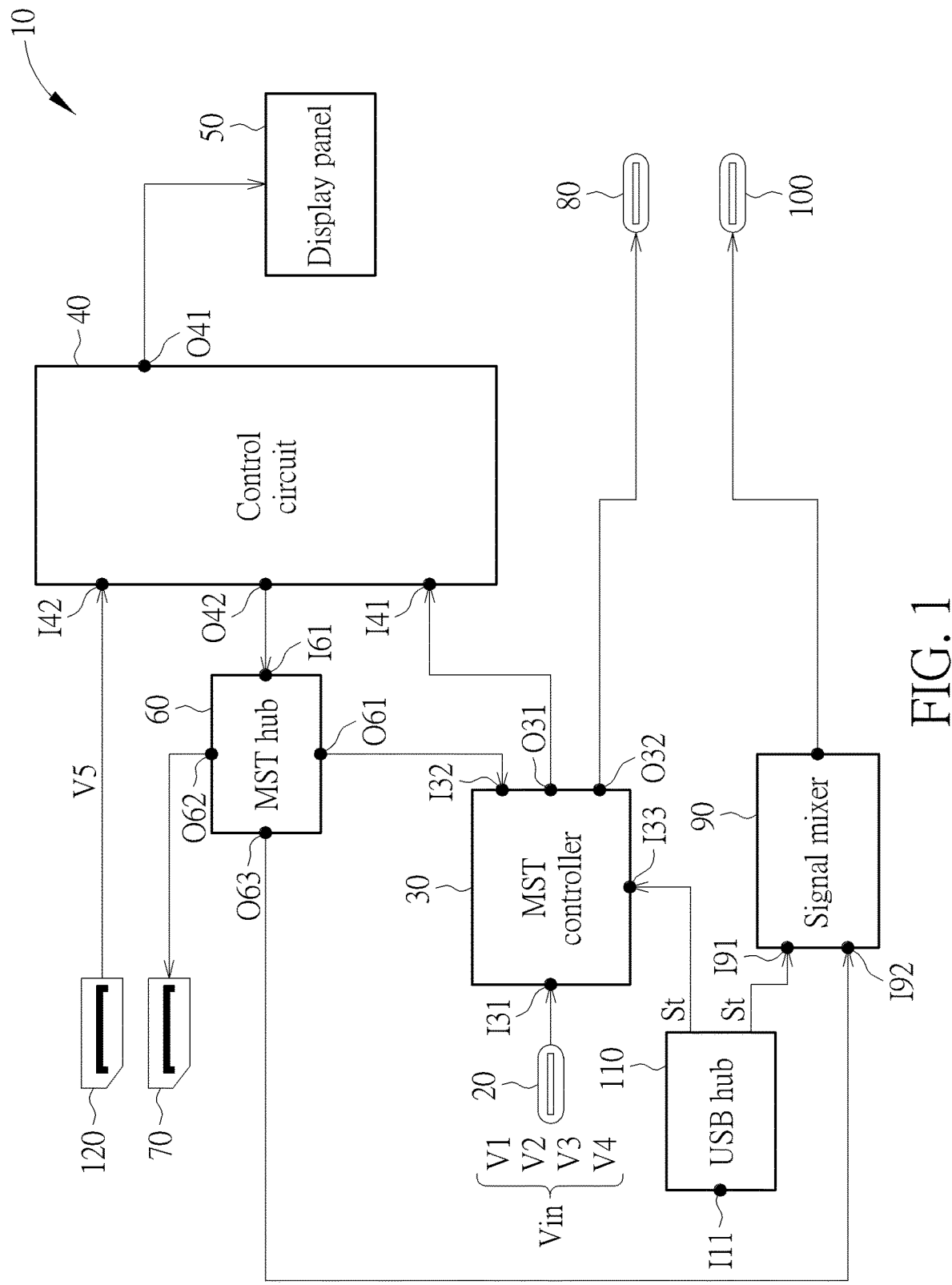
FIG. 1 is a schematic diagram of a docking display according to an embodiment of the present invention.

FIG. 1 is a schematic diagram of a docking display (aka docking monitor) 10 according to an embodiment of the present invention. The docking display 10 comprises a multi stream transport (MST) port 20, an MST controller 30, a control circuit 40, a display panel 50, an MST hub 60, and a plurality of video output ports 70, 80 and 100. The MST port 20 is used to input at least one video stream Vin, and the at least one video stream Vin can be one or more video streams of the video streams V1 to V4. In addition, the MST port 20 may be a universal serial bus (USB) port, a DisplayPort (DP), a Thunderbolt (TBT) port, a multi-function display port (Multi-Function DisplayPort; MFDP) or other ports that support the multi stream transport (MST) function. If the MST port 20 is an USB port, the USB version thereof can be USB 4. In addition, the MST controller 30 comprises a plurality of input ports I31 and I32 and a plurality of output ports O31 and O32. The MST controller 30 is used to process the at least one video stream Vin received from the MST port 20. In one embodiment of the present invention, the format of the video streams output from the output port O31 of the MST controller 30 is DisplayPort (DP) format, and when the format of any video stream of the at least one video stream Vin is not the DP format, the MST controller 30 converts the non-DP format video stream into a DP format video stream and then outputs the DP format video stream from the output port O31. The MST controller 30 could be, for example, a Thunderbolt (TBT) controller named "Goshen Ridge" produced by Intel® Corporation, but the present invention is not limited thereto. The input port I31 is coupled to the MST port 20 to receive the at least one video stream Vin, the output port O31 is used to output the at least one video stream Vin, the input port I32 is coupled to the MST hub 60, and the output port O32 is coupled to the video output port 80 of the display 10. The control circuit 40 comprises an input port I41 and a plurality of output ports O41 and O42. The input port I41 is coupled to the output port O31 of the MST controller 30 to receive at least one video stream Vin. The output port O41 is used to output a video stream V1 of the at least one video stream Vin to the display panel 50, so that the display panel 50 displays images according to the video stream V1. The output port O42 is used for outputting other video streams (e.g., video stream V2) of the at least one video stream Vin other than the video stream V1 when the at least one video stream Vin comprises a plurality of video streams (e.g., video streams V1 and V2). The control circuit 40 may be a scaler connected to the display 10, but the invention is not limited thereto. The MST hub 60 is a hub supporting the multi stream transport (MST) function, and comprises an input port I61 and a plurality of output ports O61 to O63. The input port I61 is coupled to the output port O42 of the control circuit 40, the output port O61 is coupled to the input port I32 of the MST controller 30, the output port O62 is coupled to the video output port 70, and the output port O63 is coupled to the video output port 100. The video output ports 70, 80 and 100 can be respectively connected to different displays or devices (e.g., computer, hub, etc.), and output the received video or signal to the connected displays or devices. In addition, when the at least one video stream Vin comprises a plurality of video streams, the MST hub 60 outputs the video stream V2 of the multiple video streams from one of the output ports O61 to O63 of the MST hub 60. In addition, when the MST hub 60 outputs the video stream V2 from the output port O61 to the input port I32 of the MST controller 30, the MST controller 30 will output the video stream V2 received by the input port I32 from the output port O32 to the video output port 80.

In an embodiment of the present invention, the docking display 10 may further comprises a universal serial bus (USB) hub 110 and a signal mixer 90, and the MST controller 30 may further comprise a data input port I33. An input port I92 of the signal mixer 90 is coupled to the output port O63 of the MST hub 60 to receive the video stream output from the output port O63. The USB hub 110 comprises a data input port I11 for connecting to a USB device (such as a mouse or keyboard with a USB interface) to receive a data string St (such as digital signals generated by the mouse or keyboard) from the connected USB device. The USB hub 110 can transmit the data string St received by the data input port I11 to a data input port I91 of the signal mixer 90 and the data input port I33 of the MST controller 30. The data input port I91 and the data input port I33 can both be USB ports. The signal mixer 90 is coupled to the MST hub 60, the USB hub 110 and the video output port 100, and is used to mix the video stream V2 and the data string St and output the mixed signal of the video stream V2 and data string St via the video stream output port 100. Similarly, the MST controller 30 can mix the video stream V2 and the data string St, and output the mixed signal of the video stream V2 and the data string St via the video output port 80.

In one embodiment of the present invention, the docking display 10 may not additionally comprise the USB hub 110, and the data input port 191 of the signal mixer 90 may be directly used as the data input port of the docking display 10 to replace the data input port I11 of the USB hub 110. In other words, the data input port I91 of the signal mixer 90 directly receives the data stream St from the external USB device without going through the USB hub 110. In another embodiment of the present invention, the data input port I11 of the USB hub 110 is replaced by the data input port I33 of the MST controller 30, and the data input port I33 directly receives the data string St from the external USB device instead of through the USB hub 110.

As mentioned above, the at least one video stream Vin can be one or more video streams of the video streams V1 to V4. When the at least one video stream Vin comprises a plurality of video streams, video streams of the at least one video stream Vin other than the first video stream V1 are sent to the MST hub 60 by the control circuit 40 through the output port O42. When the MST hub 60 receives any video stream from the control circuit 40, the MST hub 60 distributes the received video stream to one of the video output ports 70, 80 and 100. FIG. 2 is used to illustrate several possible situations of video streams received by each device of the docking display 10 in FIG. 1 when different numbers of video streams are received by the docking display 10. FIG. 2 only exemplarily shows several possible situations of the video streams received by the various devices of the docking display 10, and does not completely list all possible situations, but one skilled in the art can infer other unlisted situations through the description here below. The numbers in the top row in FIG. 2 represent the devices corresponding to the numbers in FIG. 1. For example, the number 20 represents the MST port 20 in FIG. 1, and the number 30 represents the MST controller 30 in FIG. 1, the number 40 represents the control circuit 40 in FIG. 1, and so on. When the MST port 20 only receives the video stream V1, the video stream V1 is transmitted to the display panel 50 via the MST controller 30 and the control circuit 40. When the MST port 20 receives the video streams V1 and V2, the video stream V1 will be transmitted to the display panel 50 through the MST controller 30 and the control circuit 40, and the video stream V2 will be transmitted to the MST hub 60 through the MST controller 30 and the control circuit 40, and the MST hub 60 outputs the video stream V2 to one of the video output ports 70, 80 and 100. When the MST port 20 receives the video streams V1 to V3, the video stream V1 will be transmitted to the display panel 50 through the MST controller 30 and the control circuit 40, and the video streams V2 and V3 will be transmitted to the MST hub 60 through the MST controller 30 and the control circuit 40, and the MST hub 60 outputs the video streams V2 and V3 to one or two of the video output ports 70, 80 and 100. When the MST port 20 receives the video streams V1 to V4, the video stream V1 will be transmitted to the display panel 50 through the MST controller 30 and the control circuit 40, and the video streams V2, V3 and V4 will be transmitted to the hub 60 through the MST controller 30 and the control circuit 40, and the MST hub 60 outputs the video streams V2, V3 and V4 to one, two or three of the video output ports 70, 80 and 100. Each video stream (e.g. V2, V3 and V4) output from the video output ports 70, 80 and 100 can be displayed on a corresponding external display.

In one embodiment of the present invention, when the at least one video stream Vin includes only the video stream V1, since the MST hub 60 will not receive any video stream, the MST hub 60 would be in a sleep mode at this time, thereby saving the overall power consumption of the docking display 10.

In one embodiment of the present invention, the docking display 10 further comprises a video input port 120 for receiving the external video stream V5, and outputting the external video stream V5 to the input port I42 of the control circuit 40. The control circuit 40 outputs one of the video stream V1 and the external video stream V5 to the display panel 50 according to the settings of the docking display 10, so as to drive the display panel 50 to display images according to the received video stream V1 or V5.

Each input port and output port of the MST controller 30, the control circuit 40 and the MST hub 60, the video output ports 70, 80 and 100, and the video input port 120 could be selected from a group consisting of a universal serial bus (USB) port, a DisplayPort, a Thunderbolt port, a multi-function display port (Multi-Function DisplayPort; MFDP), and other ports that support the multi stream transport (MST) function. In one embodiment of the present invention, the video output port 70 and the output port O62 of the MST hub 60 can be a USB port, a DP port, a Thunderbolt (TBT) port, a multi-function display port (MFDP), a high definition multimedia interface (HDMI) port, or a video graphics array (VGA) port, and the MST hub 60 may have a video format conversion function. When the video format received by the input port I61 is different from the video format corresponding to the video output port 70, the MST hub 60 would convert the video, which is expected to be output to the video output port 70, into a video format compatible to the video output port 70, and then output the converted video through the video output port 70.

Figure 3:
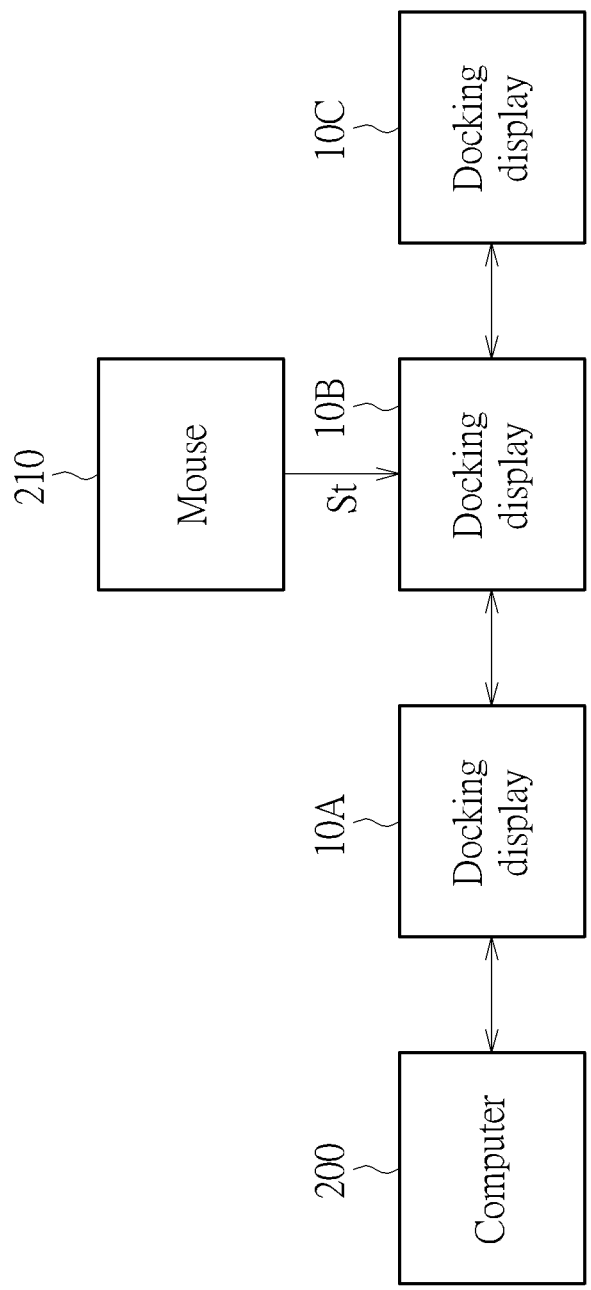
FIG. 3 is a schematic diagram for illustrating the connections of multiple docking displays according to the present invention.

FIG. 3 is a schematic diagram for illustrating the connections of multiple docking displays 10A to 10C according to the present invention. The structures of the docking displays 10A to 10C are the same as those of the docking display 10 in FIG. 1, and will not be repeated here. The docking displays 10A to 10C can be serially connected to each other through their respective MST ports 20 and video output ports 80 or 100, and coupled to the computer 200. The data input port I11 of the docking display 10B can be coupled to an external mouse 210 to receive the data string St (i.e., a cursor signal or a pointing signal) generated by the mouse 210. Since the displays 10A to 10C form a Daisy chain with the computer 200, the data string St can be transmitted to the computer 200 through the docking display 10A to control the operations of the computer 200, and the computer 200 can control the operations of the docking display 10B via the Daisy chain. Similarly, the data signal of 10A or 10C can also be transmitted to the computer 200 through the Daisy chain.

According to the above-mentioned embodiments, the docking display of the present invention not only has the function of displaying images, but also has the function of docking, so the user can connect to other devices having multi stream transport (MST) function. Therefore, the utilization of space could be more efficient. In addition, when the docking display of the present invention only receives a single video stream, the hub of the docking display can be in a sleep mode, thereby saving the overall power consumption of the docking display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A docking display, comprising:
   a first video output port;
   a second video output port;
   a multi stream transport (MST) port for inputting at least one video stream;
   an MST controller, comprising:
      a first input port coupled to the MST port for receiving the at least one video stream;
      a first output port for outputting the at least one video stream;
      a second input port; and
      a second output port coupled to the first video output port;
   a display panel for displaying images;
   a control circuit, comprising:
      a first input port coupled to the first output port of the MST controller for receiving the at least one video stream;
      a first output port for outputting a first video stream of the at least one video stream to the display panel, so that the display panel displays the images according to the first video stream; and
      a second output port for outputting video streams of the at least one video stream other than the first video stream when the at least one video stream comprises a plurality of video streams; and
   a hub, comprising:
      an input port coupled to the second output port of the control circuit;
      a first output port coupled to the second input port of the MST controller; and
      a second output port coupled to the second video output port; wherein when the at least one video stream comprises the plurality of video streams, the hub outputs a second video stream of the plurality of video streams from the first output port of the hub or the second output port of the hub.

2. The docking display of claim 1, wherein when the at least one video stream includes only the first video stream, the hub is in a sleep mode.

3. The docking display of claim 1, wherein when the second video stream is output from the first output port of the hub, the MST controller passes the second video stream from the hub through the second output port the MST controller to the first video output port.

4. The docking display of claim 1, wherein the hub outputs the second video stream to the second video output port through the second output port of the hub.

5. The docking display of claim 1, wherein the hub outputs the second video stream and a third video stream of the plurality of video streams to two external displays through the second output port of the hub and the second video output port respectively.

6. The docking display of claim 1 further comprising:
   a data input port for inputting a data string; and
   a signal mixer, coupled to the hub, the data input port and the second video output port, for mixing the second video stream and the data string, and outputting a mixed signal of the second video stream and the data string from the second video output port.

7. The docking display of claim 6, further comprising a third video output port for outputting a third video stream of the plurality of video streams, wherein the hub further comprises a third output port for transmitting the third video stream to the third video output port.

8. The docking display of claim 1, wherein the MST controller further comprises a data input port for inputting a data string; and
   wherein the MST controller mixes the second video stream and the data string, and outputs a mixed signal of the second video stream and the data string from the first video output port.

9. The docking display of claim 8, further comprising a third video output port for outputting a third video stream of the plurality of video streams, wherein the hub further comprises a third output port for outputting the third video stream to the third video output port.

10. The docking display of claim 1 further comprising a video input port for receiving an external video stream, wherein the control circuit selectively outputs one of the first video stream and the external video stream to the display panel according to a display setting so as to drive the display panel to display images.

11. The docking display of claim 1, wherein the control circuit is a scaler.

12. The docking display of claim 1, wherein the MST controller is a Thunderbolt controller.

13. The docking display of claim 1, wherein the MST port is selected from a group consisting of a universal serial bus (USB) port, a DisplayPort, a Thunderbolt port, and a multi-function display port (Multi-Function DisplayPort; MFDP).

* * * * *